United States Patent [19]

Smith

[11] Patent Number: 5,053,818
[45] Date of Patent: Oct. 1, 1991

[54] METHOD AND APPARATUS FOR COPYING SEMI-TRANSPARENT ORIGINALS USING A BLACK BACKING MEMBER

[75] Inventor: Craig A. Smith, Pittsford, N.Y.
[73] Assignee: Xerox Corporation, Stamford, Conn.
[21] Appl. No.: 629,847
[22] Filed: Dec. 19, 1990
[51] Int. Cl.⁵ .............................................. G03G 21/00
[52] U.S. Cl. .................... 355/214; 355/69; 355/71; 355/228; 355/231; 355/311
[58] Field of Search ............ 355/69, 71, 77, 214, 355/228, 229, 231, 311, 201

[56] References Cited

U.S. PATENT DOCUMENTS

| | | | |
|---|---|---|---|
| 3,930,724 | 1/1976 | McVeigh | 355/228 X |
| 3,936,172 | 2/1976 | McVeigh | 355/231 X |
| 4,050,806 | 9/1977 | Miyakawa et al. | 355/208 |
| 4,200,391 | 4/1980 | Sakamoto et al. | 355/214 |
| 4,306,804 | 12/1981 | Sakamoto et al. | 355/210 |
| 4,372,674 | 2/1983 | Yukawa et al. | 355/208 |
| 4,533,238 | 8/1985 | Miyazaki | 355/68 |
| 4,544,258 | 10/1985 | Takano | 355/1 |
| 4,912,508 | 3/1990 | Zawadzki et al. | 355/214 X |
| 5,005,049 | 4/1991 | Matsushita et al. | 355/228 |

OTHER PUBLICATIONS

L. H. Hildenbrandt, IBM Technical Disclosure Bulletin, Feb. 1977, vol. 19, No. 9, pp. 3293-3294.

*Primary Examiner*—R. L. Moses
*Assistant Examiner*—J. E. Barlow, Jr.
*Attorney, Agent, or Firm*—Kenyon & Kenyon

[57] ABSTRACT

A method for copying relatively thin documents of semitransparent or thin stock which permit images on the reverse side to show through to other portions of the copy apparatus. A sensing system is employed to sense the density of the document and otherwise determine that background images may show through. The copier may automatically produce a black sheet for backing on the thin or semitransparent stock and the original copy using the copy lighter feature to eliminate the uniform gray background which would otherwise be produced. This can be done automatically or on command by the operator.

25 Claims, 2 Drawing Sheets

METHOD AND APPARATUS FOR COPYING SEMI-TRANSPARENT ORIGINALS USING A BLACK BACKING MEMBER

BACKGROUND AND DISCUSSION OF THE INVENTION

In an electrophotographic machine such as xerographic copier, documents that are copied may vary considerably in the optical density of the paper substrate. In the absence of compensating techniques, a copier or printer designed to reproduce large areas respond to the absolute level of input density and hence, tend to produce unacceptable background when copying non-white background documents.

Particularly for relatively thin documents where images on the reverse side of the portion of the document being copied can show through, problems are incurred in the copying apparatus as it tends to copy the reverse side images in addition to the images being directly exposed to the copier. To compensate for this, often white sheets are placed as a backing to cover or eliminate the show through problem. This has proved to be inadequate as the machine tends to sense these images in any event.

It has been found that the use of black sheets as a backing on thin or semi-transparent stock has the effect of causing uniform gray background which can be eliminated with the "copy lighter" mode. Even where the user anticipates the use of such black sheets of paper, it is often not readily available, requiring considerable down time for the user to either locate the stock or otherwise develop the black paper.

Other approaches to solve this problem of thin originals include the use of sensing systems to control the charge on the developer depending on the quality of the paper sensed at initial stages of the copier operation. For example, it is known to provide forms of automatic background stabilization. The Minolta 350 copier uses a passive developer-bias control that increases bias when the average image potential increases. The 3M "Sensitron" copier increases exposure when the average reflectance across the process decreases. Both of these systems compensate for variations in substrate density for low area-coverage-documents but, undesirably, also compensate for areas of high image density mistaking the image density for the background density. Another example of an automatic background stabilization technique is that found in the Cannon MP-270F copier. For this technique the scanning system performs a brief scan of the document, sensing the background image potential with a built in electrometer. Exposure is then adjusted prior to actual exposure scan. This technique results in undesirable loss of productivity due the extra time required for the process.

Other systems such as the Apeco Electric Eye copier suggests the use of automatic exposure control in which light reflected from the original irradiates a small rectangular slit at the side of the optical system housing. This slit is covered with a sheet of standard white paper and light diffusely transmitted by this paper is then incident on a cadmium sulfide photocell placed outside the housing directly behind the paper covered slit. The output of this cell is used to vary the voltage applied to the exposure lamps and thus, vary the exposure. When the amplitude of the light decreases or increases, the system causes the exposure lamp to change accordingly, compensating for the type of original being copied.

A number of patents have suggested other systems for generating a bias voltage depending on the density of the color and the background. For example, in U.S. Pat. No. 4,372,674, a bias voltage is generated depending on the density and color of the background of the original sensed. In U.S. Pat. No., 4,050,806 there is disclosed a plurality of sensing electrodes to sense the background area and electrostatic image and apply a biasing voltage to the developing electrode in response to the lowest value of the sensed potential. In U.S. Pat. No. 4,306,804, there is disclosed the use of a reference surface for a portion of the original document by reverse optical scanning to sense the electrostatic potential on a photoconductive member and to control the intensity of the light image on the original document or the developing bias voltage. Other systems such as those disclosed in U.S. Pat. Nos. 4,200,391, 4,533,238 and 4,544,258 relate to exposure control systems but not scorotron control in an attempt to leading edge black band.

The systems described above do not always completely or satisfactorily accommodate the affect of the background image. These systems rely on varying the exposure or the bias on the photoreceptor to achieve the desired image cooperating with other adjustments on the system. As a result, although some elimination of the background image occurs, the background image tends to be exposed in any event. Consequently, the copy may be adversely affected as well because of the reduced exposure or change in developer bias to compensate for this effect.

SUMMARY OF THE INVENTION

The method and apparatus of the invention described herein overcome the problems noted above with other compensating systems. Specifically, as described in the Detailed Description of the Preferred Embodiment, the system relates providing a black sheet of backing paper to back the original during the copying process. This approach provides a background image that is uniformly gray, and the "copy lighter" feature can then be used to eliminate the uniform background from the copy. This leaves the final copy more closely related to the original.

The black copy paper for this purpose can be produced by a number of methods. If the user does not maintain a set of black sheets for this purpose, the machine can be activated to produce such a black sheet automatically or on command by the operator. For example, in one embodiment the exposure lamp is connected to a control system for turning off the exposure lamp where the image on the reverse side of the original (background image) is sensed. In this manner, the entire portion of the photoreceptor belt corresponding to the original sheet of paper will be unexposed. When copy paper is delivered for contact with the photoreceptor, because that portion of the photoreceptor is unexposed, the copy paper will be completely covered with toner powder to produce a black sheet of paper. Once delivered to the output tray, the operator can then use this sheet of paper for backing.

Another approach in which the black paper can be produced for this purpose is the use of a shutter between the optical lens and the photoreceptor. Once the image sensor in the machine senses that the original has an image on the reverse side that will show through, the shutter is closed to prevent exposure of the photoreceptor. Consequently, the black sheet of paper will be produced in the same manner as described above.

In an alternate embodiment, black paper is stored in a position for automatic delivery. A tray of black paper is arranged in connection with the platen such that upon sensing of the original having show through images, the black paper will be delivered automatically for backing of the original.

The above has been a brief discussion of deficiencies of the prior art and certain advantages of the invention. Other advantages will become apparent to those skilled in the art from the Detailed Discussion of the Preferred Embodiment which follows.

DETAILED DESCRIPTION OF THE PREFERRED EMBODIMENT

Figure 1:
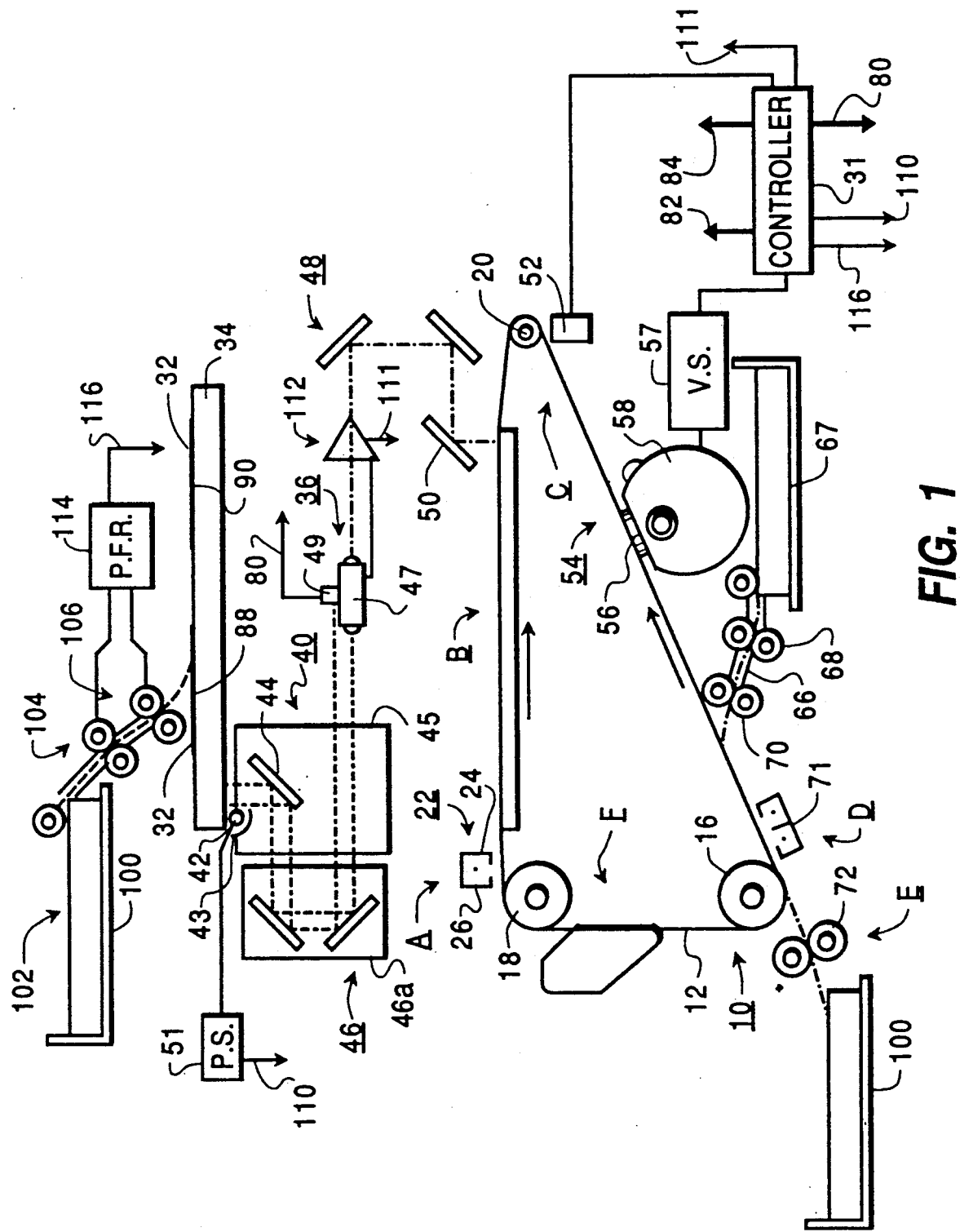
FIG. 1 is a side schematic of an electrophotographic printing machine incorporating the features of the present invention.

FIG. 1 schematically depicts the various components of an illustrative electrophotographic printing machine incorporating the control system of the present invention therein. It will become apparent from the following discussion that this control system is equally well suited for use in a wide variety of electrophotographic printing machines and is not necessarily limited in its applications to the particular embodiment shown herein. Inasmuch as the art of electrophotographic printing is well known, much of the details of the various processing stations will not be discussed in detail. Many of the elements shown are described more specifically in U.S. Pat. No. 4,912,508 which is incorporated herein by reference.

Turning now to FIG. 1, the electrophotographic printing machine uses a photoreceptor belt 10 having a photoconductive surface 12 formed on a conductive substrate. Belt 10 moves in the indicated direction, advancing sequentially through the various xerographic process stations. The belt is entrained about drive roller 16 and tension rollers 18, and 20. Roller 16 is driven by conventional motor means (not shown).

With continued reference to FIG. 1, a portion of belt 10 passes through charging station A where a corona generating device, indicated generally by the reference numeral 22, charges photoconductive surface 12 to a relatively high, substantially uniform, negative potential. Device 22 comprises a charging electrode 24 and a conductive shield 26. A high voltage supply controlled by a portion of controller 31, is connected to shield 26.

As the belt continues to advance, the charged portion of surface 12 moves into exposure station B. An original document 32 is positioned, either manually or by a document feeder mechanism (not shown) on the surface of transparent platen 34. Optics assembly 36 contains the optical components which incrementally can illuminate the document and project a reflected image onto surface 12 of belt 10. Shown schematically, these optical components comprise an illumination scan assembly 40, comprising illumination lamp 42, associated reflector 43 and full rate scan mirror 44, all three components mounted on a scan carriage 45. The carriage ends are adapted to ride along guide rails (not shown) so as to travel along a path parallel to and beneath the platen.

Lamp 42 illuminates an incremental line portion of documents 32. The reflected image is reflected by scan mirror 44 to mirror assembly 46 on a second scan carriage 46A moving at ½ the rate of mirror 44.

The document image is projected through lens 47 and reflected by a second mirror 48 and belt mirror 50, both moving at a predetermined relationship so as to proceed the projected image while maintaining the required rear conjugate onto surface 12 to form thereon an electrostatic latent image corresponding to the informational area contained within original document 32. In accordance with the present invention, an optical sensor 49 connected to controller 31 is disposed near lens 47 in the optical path of the image projected from original document 32. Adjustable illumination power supply 51, controlled by a portion of controller 31, supplies power to lamp 42.

The belt then advances past a DC electrometer 52 positioned adjacent to the photoconductive surface 12 between the exposures station B and development station C to generate a signal proportional to the dark development potential on the photoconductive surface. The dark development potential is the charge maintained on the photoconductor after charging and exposure, reflected from an opaque target or object. Preferably, the electrometer 52 is a nulling type device having a (not shown) probe and head assembly and the potential of the surface being measured. The generated signal is conveyed to controller 31 through suitable conversion circuitry. The controller 31 is also electrically connected to a (not shown) high voltage power supply through suitable logic interface to control the bias voltage on the conductive shield 26 of the charging scorotron in response to the generated signal from the electrometer 52 to adjust the dark development potential.

At development station C, a magnetic brush development system, indicated generally by the reference number 54, advances an insulating development material into contact with the electrostatic latent image. Preferably, magnetic brush development system 54 includes a developer roller 56 within a housing 58. Roller 56 transports a brush of developer material deforms belt 10 in an arc with the belt conforming, at least partially, to the configuration of the developer material. The electrostatic latent image attracts the toner particles from the carrier granules forming a toner powder image on photoconductive surface 12. As successive latent images are developed, toner particles are depleted from the developer material. A toner particle dispenser, indicated generally by the reference numeral provides additional toner particles to housing 58 for subsequent use by developer roller 56. Toner dispenser 60 includes a container for storing a supply of toner particles therein and means (not shown) for introducing the particles into developer housing 58.

An output copy sheet 66 taken from a supply tray 67, is moved into contact with the toner powder image at transfer station D. The support material is conveyed to station D by a pair of feed rollers 68 and 70. Transfer station D includes a corona generating device 71 which sprays ions onto the back side of sheet 66, thereby attracting a toner powder image from surface 12 to sheet 66. After transfer, the sheet advances to fusing station E where a fusing roller assembly 72 affixes the transferred powder image. After fusing, sheet 66 advances to an output tray (not shown) for subsequent removal by the operator. After the sheet of support material is separated from belt 10, the residual toner particles are removed at cleaning station F.

Figure 2:
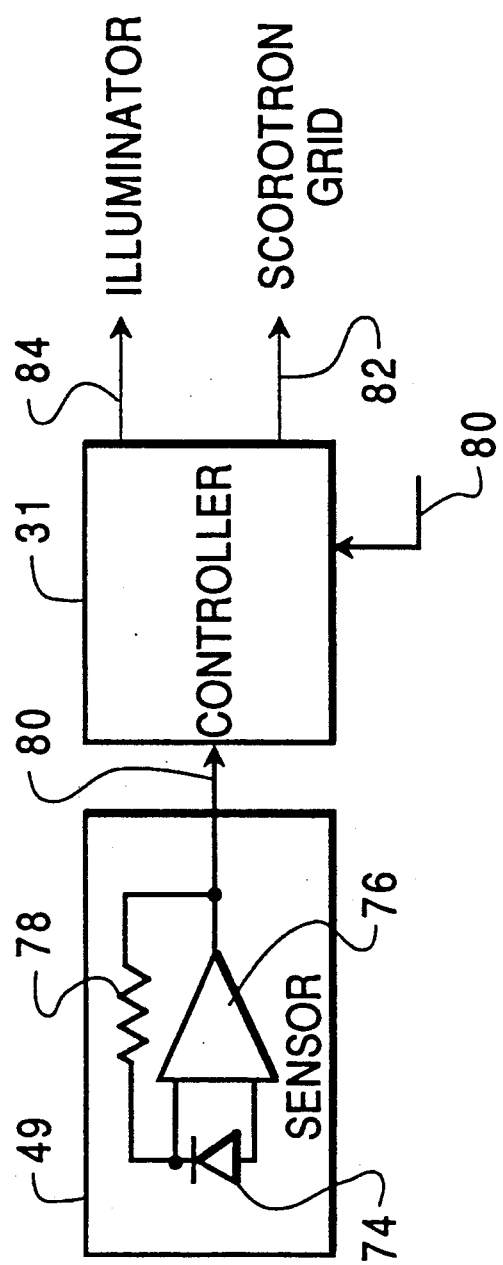
FIG. 2 illustrates a sensor and control response in accordance with the present invention.

With reference to FIG. 2, there is illustrated the sensor 49 in more detail in accordance with the present invention. Preferably, the optical sensor 49 includes a blue sensitive photodiode 74, amplifier 76, and resistor 78 supported on a (not shown) printed circuit board. Preferably the optical sensor 49 is mounted to the frame of the machine generally shown in FIG. 1 at a location near the lens 47 in the optical path of the light rays reflected from a document on platen 34. The signal 80 from the optical sensor 49 is suitable conveyed to the controller 31, in turn providing illuminator signal 84 to the power supply 51 of lamp 43.

Since the optical sensor 49 is positioned in the optical path, in effect, the sensor views a segment or portion of a document on the platen 34 as it is scanned by the illumination scan assembly 40. This allows the sensor to view the entire length of the platen 34 and any documents supported on the platen. That is by a suitable timing signal from the controller 31 the sensor 49 will provide the signal 80 to the controller at any preselected or designated location along the platen and thus along a document to be scanned.

It should be apparent that in the above-described system no prescanning of the original is required before the copy operation is initiated. Also, in systems adapted for copying two originals as illustrated by originals 88 and 90 in FIG. 1, (often known as a book mode or split scan mode of copying) the timing signals 60 can provide suitable timing signals in order that the background of each of the documents 88 and 90 can be measured by sensor 49 and on the fly corrections made to the lamp 42 during the scan operation. In a preferred embodiment at the beginning of the scan of a document a reading is taken of a top portion of the document 7 millimeters wide by 70 millimeters in length.

Where the signal 80 to controller 31 indicates presence of a background image on an original document 32, controller provides signal 110 to power source 51 to deactivate power to lamp 32. Upon deactivation lamp 32 provides no illumination to the original. Since no image is reflected to the photoreceptor belt 12, copy output sheet 67 will be completely black from the action at transfer station D. This blackened sheet is then used a backing for the original, manually or otherwise. By covering the original with a black sheet, the background will become uniformly gray. Use of the "copy lighter" feature will eliminate this uniform background from the copy. As discussed above, any "copy lighter" system should be satisfactory for this purpose. As this feature is well known it is not described in detail herein.

The same result can be accomplished by controlling the optical path rather than the light source. For example, as shown in FIG. 1, a shutter 112 is arranged downstream in the optical path between lens 48 and photoreceptor belt 12. In this embodiment shutter 112 is fixed to lens 47; however it could be fixed in space in any position, so long as it can block light to photoreceptor belt. As with power source 51, where the appropriate signal 80 from sensor 49 indicates a background image, controller provides signal to 111 to shutter 112 to close, blocking light to belt 12.

Similar to power source 51, sensor 49 provides signal 80 to controller 31 to indicate background image; the controller provides signal 114 to close shutter. Any conventional mechanism can be used for that purpose.

In another embodiment, black paper can be automatically dispensed to back an original. Tray 100 contains a stack of black paper 102. Feed rollers 104 and 106 can be activated to deliver a sheet to the back of the original. In this arrangement the power supply to the feed roller PFR 114 is controller by controller 31. As with the other embodiments, when signal 80 indicates a background image, controller 31 generates a signal 116 to actuate power supply PFR 114 which in turn actuates feed rollers 104, 106. Once the original is covered, the "copy lighter" feature will eliminate the uniform background from the copy. With this latter embodiment no user effort is required except to insure an adequate supply of black backing sheets.

Copy machines that are the subject of this application have covers that cover platen 34 shown in FIG. 1. In another embodiment of the invention a belt, or other replaceable segment, can be provided in the cover having a black portion that corresponds to the black sheet discussed above. This belt can be moved automatically in response to a signal from sensor 49 or manually by the operator.

While there has been illustrated and described what is at present considered to be a preferred embodiment of the present invention, it will be appreciated that numerous changes and modifications are likely to occur to those skilled in the art and it is intended in the appended claims to cover all those changes and modifications while fall within the true spirit and scope of the present invention.

What is claimed is:

1. A reproduction apparatus comprising:
   (a) a moving photoconductive member;
   (b) charging means to produce a first potential on the photoconductive member;
   (c) illuminating means for illuminating an original document having a background area and an image area;
   (d) optical means for focusing a light image of the original document onto the photoconductive member, the document and the optical means mounted for relative movement;
   (e) sensor means in the optical path for sensing the optical density of a portion of the document during illumination; and
   (f) control means for controlling the illumination of the background area and means responsive to the sensor means during illumination for eliminating the power to said illumination means wherein a portion of said document being totally undeveloped, said portion corresponding to the original document.

2. The apparatus according to claim 1 further comprising means for supplying an output copy sheet, said means cooperating with said photoconductive member to produce a black copy sheet corresponding to the portion of said belt being totally undeveloped.

3. The apparatus according to claim 2 wherein said illumination means includes an illumination lamp and a power source for providing power to said lamp, said power source being connected to said control means.

4. The apparatus according to claim 3 wherein said control means is a controller for operating said power source and an "on" position when said lamp is in full illumination and an "off" position where no illumination is emanating from said lamp.

5. The apparatus according to claim 4 wherein said sensor means includes an optical sensor for sensing the image on said original, said optical sensor being electrically connected to said controller for controlling the power source to said illumination lamp.

6. A reproduction apparatus comprising:
   (a) a moving photoconductive member;
   (b) a charging means to produce a first potential on the photoconductive member;
   (c) illuminating means for illuminating an original document having a background area and an image area;
   (d) optical means for focusing a light image of an original document onto the photoconductive member; the document and the optical means mounted for relative movement; sensor means in the optical path of the optical means for sensing the optical density of a portion of the document during illumination;
   (e) means for blocking the light emanating from said optical means to said photoconductive member, said means being operable between an open position where said light is unblocked or a closed position where said light is blocked; and
   (f) control means connected to said blocking means and said sensing means to move said blocking means to a closed position upon a signal from said sensing means indicating that the original document is sufficiently thin to expose images on the reverse side of the document.

7. The apparatus according to claim 6 wherein said blocking means is a shutter located downstream of said optical means.

8. The apparatus according to claim 7 wherein said optical means includes a lens for directing the image to said photoconductive member.

9. The apparatus according to claim 8 further comprising a source of copy paper and means for delivering copy paper to said photoconductive member for transferring the image from said photoconductive member to said copy paper to provide a black paper corresponding to the portion of a photoconductive member undeveloped as a result of said shutter being in a closed position.

10. A reproduction apparatus comprising:
    (a) a moving photoconductive member;
    (b) charging means to produce a first potential on the photoconductive member;
    (c) illuminating means for illuminating an original document having a background area and an image area;
    (d) optical means for focusing a light image of the original document onto the photoconductive member, the document and the optical means mounted for relative movement;
    (e) sensor means in the optical path of the optical means for sensing the optical density of the lead portion of the document during illumination;
    (f) a source of black paper having means for delivering said black paper to the position of said original document to cover said original document; and
    (g) control means responsive to said sensor means for sensing the lead portion of the document during the illumination causing said delivery means to deliver a sheet of black paper from said source of black paper to cover said original.

11. The apparatus according to claim 10 wherein said source of black paper is a tray containing black paper corresponding in size to the original.

12. The apparatus according to claim 11 wherein said means for delivering black paper includes feed roller for engaging said paper in said tray and directing said paper to cover said original.

13. A method for copying documents with background images comprising:
    (a) moving photoconductive member along a closed path;
    (b) charging the photoconductive member to a first potential;
    (c) arranging an original document having a background area and an image area for exposure to an illuminator;
    (d) sensing the optical density of a portion of the original document to be copied during illumination; and
    (e) directing a signal as a result of said sensing step for deactivating said illuminator thereby maintaining a charge throughout the portion of the photoconductive member originally charged;
    (f) applying toner to the charged portion of the photoconductive member;
    (g) transferring said toner to an output copy sheet to form a black sheet;
    (h) placing said output copy sheet over said original and subsequently copying said original.

14. The method according to claim 13 wherein said illuminator includes an illumination lamp and a power source for providing power to said lamp.

15. The method according to claim 14 further comprising a controller for operating said power source between an and an "on" position when said lamp is activated and an "off" position where said lamp is deactivated.

16. The method according to claim 14 wherein said sensing step includes an optical sensor for sensing the image on said original, said optical sensor being electrically connected to said controller for controlling the power source to said illumination lamp.

17. A method for copying documents with background image comprising:
    (a) moving a photoconductive member along a closed path;
    (b) charging said photoconductive member to produce a first potential on the photoconductive member;
    (c) illuminating an original document having a background area and an image area;
    (d) optically focusing a light image of the original document onto the photoconductive member; sensing the optical density of a portion of the document during illumination;
    (e) blocking the light produced during said focusing step to the photoconductive member; and
    (f) said blocking step occurring in response to said sensing step upon receipt of a signal indicating that the original document is sufficiently thin to expose images on the reverse side of the document.

18. The method according to claim 17 wherein said blocking step includes a shutter located downstream of said focusing step.

19. The method according to claim 18 wherein said focusing step includes a lens for directing the image to said photoconductive member, said shutter being located in the optical path between said lens and said photoconductive member.

20. The method according to claim 19 further comprising delivering output copy paper to said photoconductive member for transferring the image from said photoconductive member to said copy paper to provide a black paper corresponding to the portion of a photoconductive member undeveloped as a result of said shutter being in a closed position.

21. A method for copying a document with a background image comprising:
 (a) moving photoconductive member along a closed path;
 (b) charging the photoconductive member to produce a first potential on the photoconductive member;
 (c) illuminating an original document having a background area and an image area;
 (d) optically focusing a light image of the original document onto the photoconductive member;
 (e) sensing the optical density of a portion of the document during illumination;
 (f) delivering a sheet of black paper to the position of said original document to cover said original document in response to a signal from said sensing step.

22. The method according to claim 21, said sheet of black paper is contained in a tray for containing sheets of black paper corresponding in size to the original.

23. The method according to claim 22 wherein said delivering step includes operating feed roller for engaging said sheets of paper in said tray and directing said paper to cover said original upon receiving said signal during said sensing step.

24. A reproduction apparatus comprising:
 (a) a movable photoconductive member;
 (b) charging means to produce a first potential on the photoconductive member;
 (c) illuminating means for illuminating an original document having a background area and an image area;
 (d) optical means for focusing a light image of the original document onto the photoconductive member, the document and the optical means mounted for relative movement;
 (e) light control means for eliminating light from being focused to said photoconductive member;
 (f) delivery means for delivering an output copy sheet; and
 (g) control means responsive to the user for cooperating with said light control means and said delivery means to deliver a sheet of black paper.

25. A reproduction apparatus comprising:
 (a) a movable photoconductive member;
 (b) charging means to produce a first potential on the photoconductive member;
 (c) illuminating means for illuminating an original document having a background area and an image area;
 (d) optical means for focusing a light image of the original document onto the photoconductive member, the document and the optical means mounted for relative movement;
 (e) sensor means in the optical path of the optical means for sensing the optical density of the lead portion of the document during illumination;
 (f) a cover having a black belt and means for moving said black belt over said original;
 (g) control means responsive to sensing of the lead portion of the document during illumination causing said means for moving said black belt to move said black belt to cover said original.

* * * * *

UNITED STATES PATENT AND TRADEMARK OFFICE
CERTIFICATE OF CORRECTION

PATENT NO. : 5,053,818

DATED : October 1, 1991

INVENTOR(S) : Craig A. Smith

It is certified that error appears in the above-indentified patent and that said Letters Patent is hereby corrected as shown below:

| Column | Line | |
|---|---|---|
| 1 | 14 | Change "respond" to --responds--. |
| 1 | 15 | Change "tend" to --tends--. |
| 2 | 21 | Before "leading" insert --eliminate a--. |
| 2 | 24 | Change "affect" to --effect--. |
| 4 | 7 | Change "proceed" to --precede--. |
| 4 | 43 | After "material" insert --which--. |
| 5 | 12 | Change "suitable" to --suitably--. |
| 5 | 41 | After "controller" insert --31--. |
| 5 | 47 | Before "a backing" insert --as--. |
| 6 | 6 | Change "controller" (first occurrence) to --controlled--. |
| 6 | 50 | Change "being" to --remains--. |

UNITED STATES PATENT AND TRADEMARK OFFICE
CERTIFICATE OF CORRECTION

PATENT NO. : 5,053,818

DATED : October 1, 1991

INVENTOR(S) : Craig A. Smith

It is certified that error appears in the above-indentified patent and that said Letters Patent is hereby corrected as shown below:

9      22      After "claim 21" insert --wherein--.

Signed and Sealed this

Second Day of August, 1994

Attest:

BRUCE LEHMAN

Attesting Officer    Commissioner of Patents and Trademarks